(12) United States Patent
Huang et al.

(10) Patent No.: US 10,259,172 B2
(45) Date of Patent: Apr. 16, 2019

(54) FABRICATION METHOD OF MAGNETIC DEVICE

(71) Applicant: Industrial Technology Research Institute, Hsinchu (TW)

(72) Inventors: Wei-Chin Huang, Tainan (TW); Chuan-Sheng Chuang, Tainan (TW); Chih-Hsien Wu, Changhua County (TW); Ching-Chih Lin, Tainan (TW); Wen-Hsi Lee, Kaohsiung (TW); Kai-Jyun Jhong, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 569 days.

(21) Appl. No.: 14/981,914

(22) Filed: Dec. 29, 2015

(65) Prior Publication Data

US 2017/0173873 A1 Jun. 22, 2017

(30) Foreign Application Priority Data

Dec. 17, 2015 (TW) .............................. 104142574 A

(51) Int. Cl.
*B29C 67/00* (2017.01)
*B33Y 10/00* (2015.01)
(Continued)

(52) U.S. Cl.
CPC ........ *B29C 67/0077* (2013.01); *B29C 64/153* (2017.08); *B29C 64/364* (2017.08);
(Continued)

(58) Field of Classification Search
CPC ............................................... B29C 67/0077
See application file for complete search history.

(56) References Cited

U.S. PATENT DOCUMENTS 5,182,170 A    1/1993   Marcus et al.
6,215,093 B1    4/2001   Meiners et al.
(Continued)

FOREIGN PATENT DOCUMENTS

CA         2610602 A1    12/2006
CA         2610602 C     2/2014
(Continued)

OTHER PUBLICATIONS

Baicheng Zhang et al., "Microstructure and Magnetic Properties of Fe—Ni Alloy Fabricated by Selective Laser Melting Fe/Ni Mixed Powders," Journal of Materials Science & Technology, vol. 29, 2013, pp. 757-760.
(Continued)

*Primary Examiner* — Larry W Thrower
(74) *Attorney, Agent, or Firm* — JCIPRNET

(57) ABSTRACT

A fabrication method of magnetic device is provided. A magnetic material is provided. A portion of the magnetic material is selectively irradiated by an energy beam, and reactive gas is introduced simultaneously. The magnetic material being irradiated is melted and solidified to form a solidified layer. An outer layer of the solidified layer reacts with the reactive gas to form a barrier layer, so as to form a magnetic unit including the solidified layer and the barrier layer. It is determined whether the manufacturing process of the same layer is finished, if not, the energy beam is moved to the other portion of the magnetic material. The above step is repeated to overlap multiple magnetic units to form a magnetic layer. If yes, the flow returns to the $1^{st}$ step to provide another magnetic material to the magnetic layer. The above steps are repeated to form a 3D magnetic device.

21 Claims, 8 Drawing Sheets

(51) Int. Cl.
  *B33Y 80/00* (2015.01)
  *B29C 64/153* (2017.01)
  *B29C 64/364* (2017.01)
  *B33Y 70/00* (2015.01)
  *B29L 31/00* (2006.01)

(52) U.S. Cl.
  CPC .............. *B33Y 10/00* (2014.12); *B33Y 80/00* (2014.12); *B29K 2995/0008* (2013.01); *B29L 2031/00* (2013.01); *B33Y 70/00* (2014.12)

(56) References Cited

U.S. PATENT DOCUMENTS

| | | |
|---|---|---|
| 6,814,926 B2 | 11/2004 | Geving et al. |
| 6,823,928 B2 | 11/2004 | Sercombe et al. |
| 6,848,494 B2 | 2/2005 | Newell et al. |
| 8,075,710 B2 | 12/2011 | Skaarman et al. |
| 2004/0060682 A1 | 4/2004 | Newell et al. |
| 2004/0182202 A1 | 9/2004 | Geving et al. |
| 2004/0184944 A1 | 9/2004 | Geving et al. |
| 2004/0226405 A1 | 11/2004 | Geving et al. |
| 2009/0042051 A1 | 2/2009 | Skarman et al. |
| 2011/0129685 A2 | 6/2011 | Skarman et al. |
| 2014/0175876 A1 | 6/2014 | Cheatham, III et al. |

FOREIGN PATENT DOCUMENTS

| | | |
|---|---|---|
| CN | 101199030 A | 6/2008 |
| CN | 101509053 | 8/2009 |
| CN | 101752074 | 6/2010 |
| CN | 101917093 | 12/2010 |
| CN | 101928810 | 12/2010 |
| CN | 101199030 B | 1/2011 |
| CN | 103415902 | 11/2013 |
| CN | 104425123 | 3/2015 |
| CN | 104919546 | 9/2015 |
| DE | 19649865 | 2/1998 |
| DE | 60302518 T2 | 8/2006 |
| EP | 0946325 A1 | 10/1999 |
| EP | 0946325 B1 | 8/2001 |
| EP | 1402978 A1 | 3/2004 |
| EP | 1402978 B1 | 11/2005 |
| EP | 1899994 A1 | 3/2008 |
| EP | 1899994 A4 | 9/2010 |
| JP | 2014040663 | 3/2014 |
| JP | 2016516896 | 6/2016 |
| TW | I369259 | 8/2012 |
| TW | 201444268 | 11/2014 |
| WO | 9824574 | 6/1998 |
| WO | 2004094089 | 11/2004 |
| WO | 2006135324 | 12/2006 |

OTHER PUBLICATIONS

J. Deckers et al., "Direct Selective Laser Sintering/Melting of High Density Alumina Powder Layers at Elevated Temperatures," Physics Procedia, vol. 56, 2014, pp. 117-124.

Kai Liu et al., "Indirect selective laser sintering of epoxy resin-Al2O3 ceramic powders combined with cold isostatic pressing," Ceramics International, vol. 40, 2014, pp. 7099-7106.

Sasan Dadbakhsh et al., "Effect of Layer Thickness in Selective Laser Melting on Microstructure of Al/5 wt.%Fe2O3 Powder Consolidated Parts," ScientificWorldJournal, Jan. 2014, pp. 1-10.

Kai Jyun Jhong et al., "Microstructure and Magnetic Properties of Magnetic Material Fabricated by Selective Laser Melting," Physics Procedia, vol. 83, 2016, pp. 818-824.

Baicheng Zhang et al., "Studies of magnetic properties of permalloy (Fe-30%Ni) prepared by SLM technology," Journal of Magnetism and Magnetic Materials, vol. 324, 2012, pp. 495-500.

"Office Action of Japan Counterpart Application," dated May 16, 2017, p. 1-p. 5, in which the listed references were cited.

"Office Action of Taiwan Counterpart Application", dated Sep. 5, 2016, p. 1-p. 10, in which the listed references were cited.

Baicheng Zhang, et al., "Microstructure and Magnetic Properties of FeeNi Alloy Fabricated by Selective Laser Melting Fe/Ni Mixed Powders," J. Mater. Sci. Technol., vol. 29, No. 8, Aug. 2013, pp. 757-760.

Katsumi Yamazaki, et al., "Loss Analysis of Permanent Magnet Motors with Concentrated Windings-Variation of Magnet Eddy Current Loss Due to Stator and Rotor Shapes," IAS '08. IEEE Industry Applications Society Annual Meeting, Oct. 5-9, 2008, pp. 1-8.

Jeong-Hyoun Sung, et al., "A New Approach to Vector Control for a Linear Induction Motor Considering End Effects," Conference Record of the IEEE Industry Applications Conference, Thirty-Fourth IAS Annual Meeting, vol. 4, Oct. 3-7, 1999, pp. 2284-2289.

Dahaman Ishak, et al., "Eddy-Current Loss in the Rotor Magnets of Permanent-Magnet Brushless Machines-Having a Fractional Number of Slots Per Pole," IEEE Transactions on Magnetics, vol. 41, No. 9, Sep. 2005, pp. 2462-2469.

Baicheng Zhang, et al., "Studies of magnetic properties of permalloy (Fe-30%Ni) prepared by SLM technology," Journal of Magnetism and Magnetic Materials, vol. 324, Feb. 2012, pp. 495-500.

FABRICATION METHOD OF MAGNETIC DEVICE

CROSS-REFERENCE TO RELATED APPLICATION

This application claims the priority benefit of Taiwan application no. 104142574, filed on Dec. 17, 2015. The entirety of the above-mentioned patent application is hereby incorporated by reference herein and made a part of this specification.

BACKGROUND OF THE DISCLOSURE

Field of the Disclosure

The disclosure relates to a fabrication method, and particularly relates to a fabrication method of a magnetic device.

Description of Related Art

In recent years, along with development of a driving system of motor, frequency control of a driving power becomes possible, high-speed motors capable of implementing variable-speed operation or having a rotation frequency above a commercial frequency are increased. Magnetic material is a key to implement a driving effect by a driving element such as a motor, etc. During a high-speed rotating process of the motor, the magnetic material may have an eddy current phenomenon in internal thereof due to an electromagnetic induction effect. The eddy current may produce a large amount of heat to decrease a service life of a magnetic device as well as an external device, or directly damage the same or even cause a fire. Moreover, since shaping of the magnetic material is not easy, the above problem also becomes a bottleneck in development of various equipment.

Existing shaping methods of the magnetic material mainly include silicon steel sheet compression shaping and a soft magnetic composite (SMC) material shaping. A flow range of the eddy current is limited based on isolation of a high resistance layer, so as to decrease an effect of eddy current loss, and decrease a heating amount of the magnetic material to avoid damaging the motor due to excessive heat.

In the silicon steel sheet compression shaping of the existing technique, since shaping of the silicon steel sheets is very limited, it can only be implemented through lamination of the silicon steel sheets, and the problem of eddy current loss still has much room for improvement. In the SMC material of the existing technique, the SMC material is formed by compressing magnetic powder and a polymer material. By compressing the polymer material, an interface layer with a high resistance is formed to achieve an effect of reducing the eddy current loss. However, the polymer interface layer has a low heat resistance temperature, and a magnetic permeability thereof is affected, it is not suitable for being applied to the high-speed motor device.

When the magnetic material is subjected to an electromagnetic field, the electromagnetic field is produced in internal thereof to generate an induced current, which is referred to as the eddy current, and the effect of eddy current loss (Pc) is increased exponentially along with increase of a thickness of the silicon steel sheets, a motor rotation speed, and increase of the magnetic field. Therefore, if the thickness of each of the silicon steel sheets can be decreased to reduce a range of the eddy current, the effect of eddy current loss can be greatly decreased.

In the silicon steel sheet compression shaping of the existing technique, the aforementioned principle is adopted to laminate a plurality of silicon steel sheets with thin thickness to achieve the effect of decreasing the eddy current loss, though in the existing laminating process of the silicon steel sheets, a thickness of each silicon steel sheet is limited by the existing manufacturing process, and a reduction magnitude thereof is limited, such that the effect of effectively decreasing the eddy current loss cannot be achieved.

On the other hand, regarding the SMC material of the existing technique, although the SMC material can be cut into a plurality of tiny magnetic material units, the existing SMC material may cause problems of low magnetic permeability, poor intensity, and poor heat dissipation effect, etc.

Future design of magnetic devices applied in motors, etc., will be gradually developed towards directions of miniaturization, high performance, high rotating speed and low heating amount. However, the products produced based on the existing technique are not satisfactory in both appearance and performance due to the limited process which greatly limits development and improvement of the magnetic device. Therefore, how to improve the existing process technique to produce products with low eddy current loss and high magnetic permeability becomes one of the problems to be solved urgently in the industry.

SUMMARY OF THE DISCLOSURE

Based on related research such as finite element simulation, it is discovered that if a same layer of a magnetic material is cut into a plurality of small unit combinations, the performance and heating phenomenon of the magnetic material are further ameliorated, though the existing lamination process of silicon steel sheets is not easy to achieve the effect of cutting the magnetic material into small unit combinations. In addition, although a soft magnetic composite (SMC) material can be cut into a plurality of tiny granular units, it has disadvantages of low magnetic permeability, poor strength and poor heat dissipation effect.

The disclosure provides a fabrication method of a magnetic device including following steps. First, a magnetic material is provided. Then, a portion of the magnetic material is selectively irradiated by using an energy beam, and a reacting gas is introduced simultaneously, such that during a process that the energy beam melts and solidifies the magnetic material, the magnetic material is in an environment filled with the reacting gas, and the portion of the magnetic material being irradiated is melted and solidified to form a solidified layer, where an outer layer of the solidified layer reacts with the reacting gas to form a barrier layer on a surface of the solidified layer, so as to form a magnetic unit composed of the solidified layer and the barrier layer. Then, it is determined whether a manufacturing process of a same layer is ended, and if not, a path of the energy beam is controlled to move the energy beam to another portion of the magnetic material, and the step of forming the magnetic unit having the barrier layer coated on the surface of the solidified layer are repeated, and the magnetic units having the barrier layer coated on the surface of the solidified layer are mutually overlapped to form a magnetic layer. If the manufacturing process of the same layer is finished, the flow returns to the first step, and another layer of the magnetic material is provided to a surface of the magnetic layer. Then, the steps of forming the magnetic layer are repeated to form a three-dimensional (3D) magnetic device.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

The disclosure provides a fabrication method of a magnetic device, which is capable of decreasing an eddy current area of an electromagnetic induction current, and a proportion of eddy current loss, so as to improve magnetic permeability and stability of the magnetic device, and produce a customized appearance.

The disclosure is described below with reference of the accompanying drawings, in which exemplary embodiments of the disclosure are shown. The disclosure may, however, be embodied in many different forms and should not be construed as being limited to the exemplary embodiments set forth herein. In these drawings, for clarity's sake, sizes and relative sizes of each layer and each region can be exaggeratedly depicted.

Figure 1A:
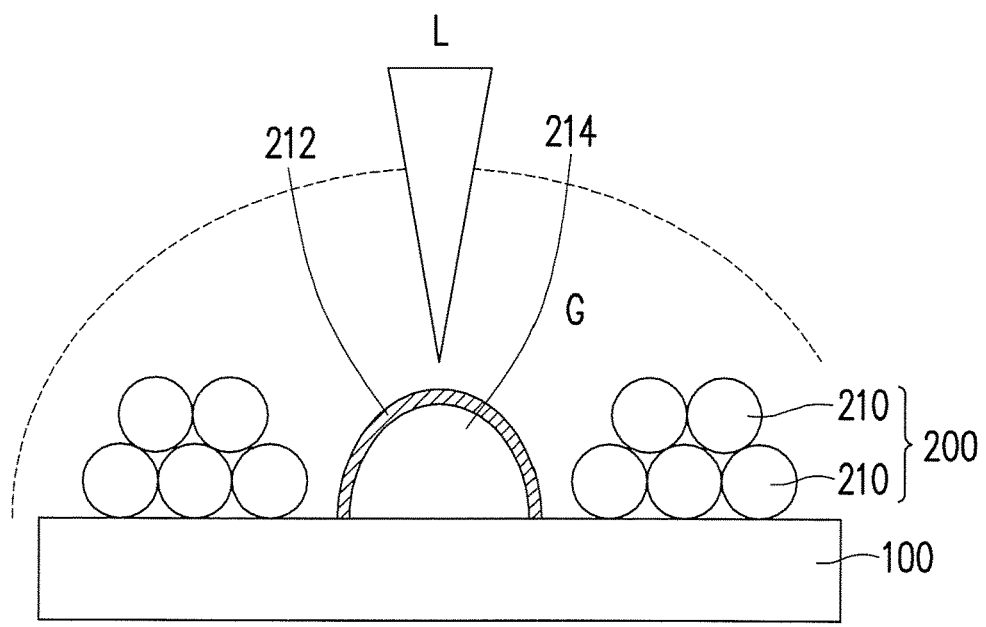
FIG. 1A and FIG. 1B are schematic diagrams of a fabrication method of a magnetic device according to an embodiment of the disclosure.
Figure 1B:
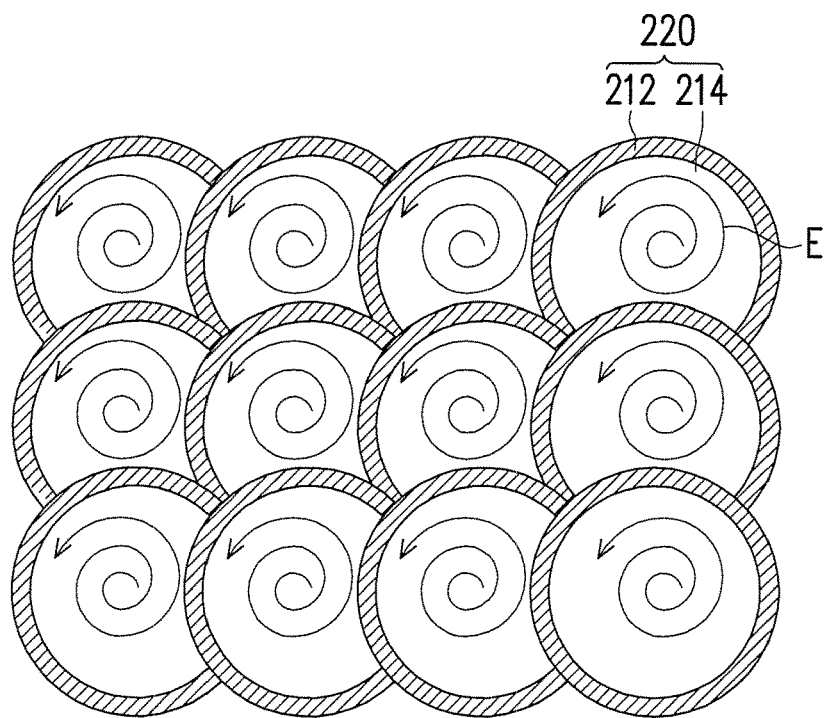

FIG. 1A and FIG. 1B are schematic diagrams of a fabrication method of a magnetic device according to an embodiment of the disclosure. Referring to FIG. 1A, the disclosure provides a fabrication method of a magnetic device, by which in an environment filled with a reacting gas G, an energy beam L is used to selectively irradiate a portion of a magnetic material 200. The magnetic material 200 includes a plurality of magnetic powder 210, and the magnetic powder 210 in the irradiated partial region is melted and solidified to form a solidified layer 214, where an outer layer of the solidified layer 214 reacts with the reacting gas G to form a barrier layer 212 on a surface of the solidified layer 214, so as to form a magnetic unit 220 composed of the solidified layer 214 and the barrier layer 212, as shown in FIG. 1B. By adjusting a scan path of the energy beam L, the solidified layers 214 coated by the barrier layer 212 may have different stacking arrangements, such that a distribution range of an eddy current E is limited, by which not only a shaping limitation of the existing manufacturing process is ameliorated, problems of an eddy current loss and performance of the magnetic material are also mitigated.

In the present embodiment, a three-dimensional (3D) printing technique and an additive manufacturing technique are taken as an example for description, though the disclosure is not limited thereto. To be specific, a technical principle of selective laser sintering (SLS) is to lay down the material (for example, the powder) on a working platform, and focus the laser energy beam to a specific position of the material to implement powder sintering, and then the steps of laying down the powder and laser sintering are repeated to a 3D workpiece by stacking layer-by-layer. Compared to the conventional subtractive processing technique, the additive manufacturing technique has advantages in efficiency and cost, and may shorten a production duration of complex articles, by which multiple processes and the time required for replacing a processing machine are saved, and mass production and customization are achieved, so as to greatly improve manufacturing efficiency and overcome a shaping limitation of the existing manufacturing process. The disclosure is further described below with reference of drawings.

Figure 2:
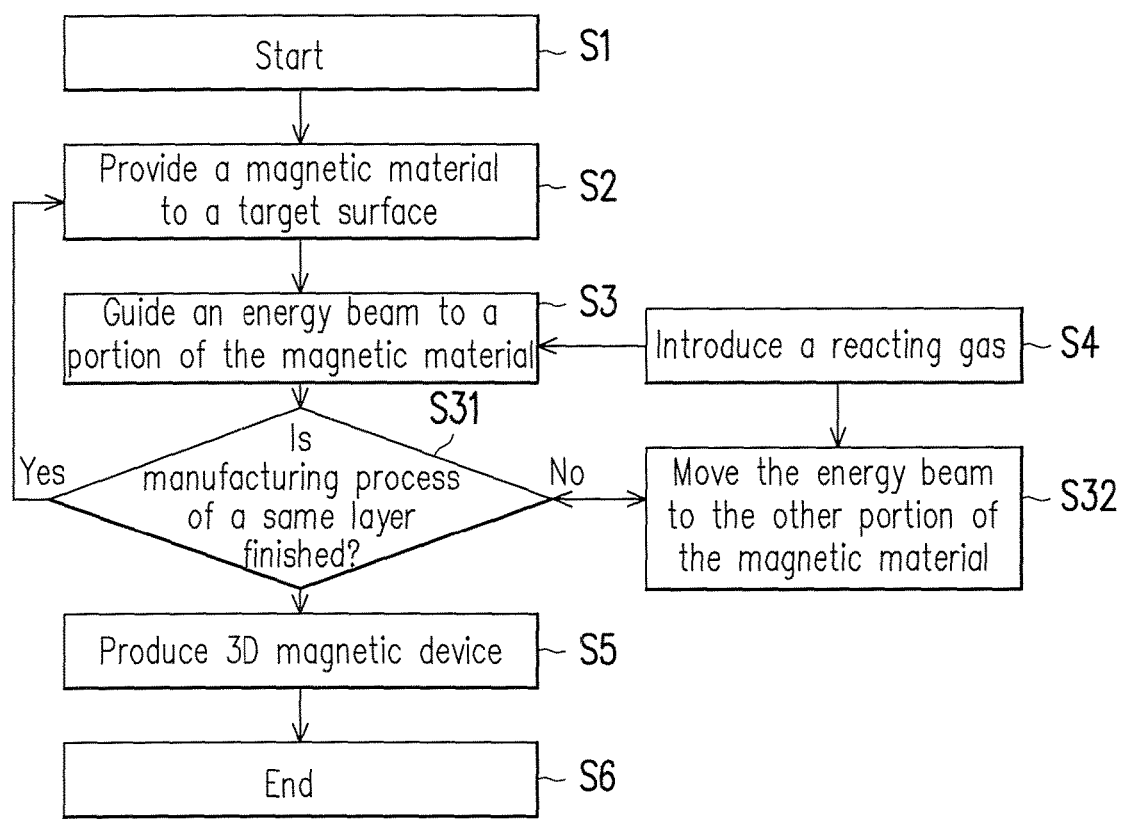
FIG. 2 is a flowchart of a fabrication method of a magnetic device according to an embodiment of the disclosure.

FIG. 2 is a flowchart of a fabrication method of a magnetic device according to an embodiment of the disclosure, and FIG. 3A to FIG. 3E are schematic diagrams of a fabrication method of a magnetic device according to an embodiment of the disclosure. FIG. 2 and FIG. 3A to FIG. 3E are referred simultaneously for further description.

Figure 3A:
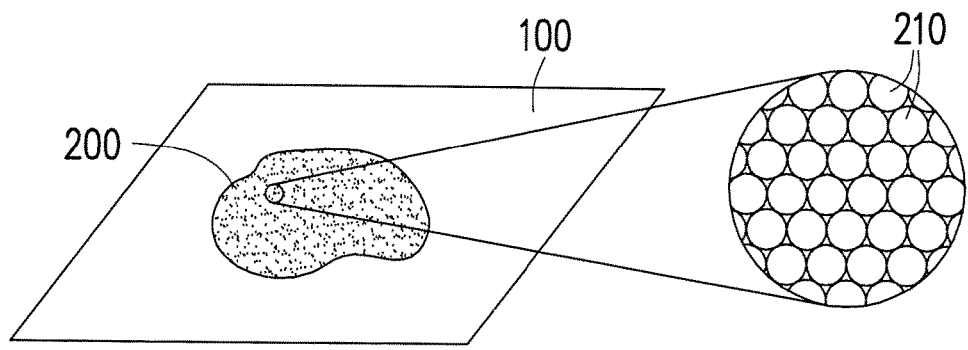
FIG. 3A to FIG. 3E are schematic diagrams of a fabrication method of a magnetic device according to an embodiment of the disclosure.

Referring to steps S1 and S2 of FIG. 2 and FIG. 3A, the magnetic material 200 is provided to a target surface 100 layer-by-layer according to a 3D digital model image data of a workpiece to be formed, and FIG. 3A is a schematic diagram of one layer of the magnetic material 200. As shown in the step S2 of FIG. 2 and FIG. 3A, the provided magnetic material 200 includes a plurality of magnetic powder 210. The magnetic material 200 may include metal, ceramics, semiconductor, polymer or a composite material thereof. Moreover, the magnetic material 200 also includes a soft magnetic material or a permanent magnetic material.

Figure 3B:
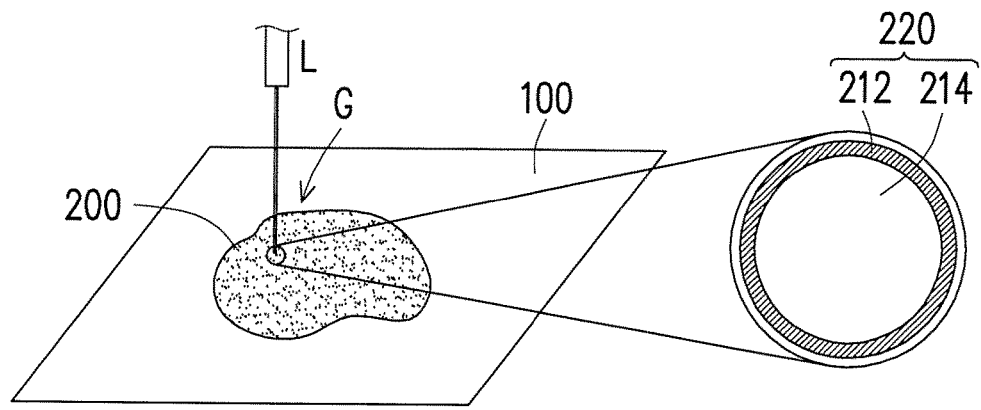

After one layer of the magnetic material 200 is provided to the target surface 100, as shown in steps S3, S4 of FIG. 2 and FIG. 3B, the energy beam L is used to selectively irradiate the magnetic powder 210 to a portion of the magnetic material 200, and the reacting gas G is introduced simultaneously, such that during a process that the energy beam L melts and solidifies the magnetic material 200, the magnetic material 200 is in an environment filled with the reacting gas G. It should be noted that the providing of the energy beam L and the providing of the reacting gas G in the steps S3 and S4 have no order of priority, and as long as the magnetic material 200 is surrounded by the reacting gas G while the energy beam L irradiates the magnetic material 200, it is considered to meet the spirit of the disclosure. The energy beam L can be a laser beam, an electron beam, an electric arc, or a composite energy combined with two or more of the above beams, and an energy density of the energy beam L is, for example, below $10^{12}$ W/cm$^3$. The reacting gas G can be a reactive gas or a gas mixed with the reactive gas and a protective gas. The reactive gas is, for example, adapted to react with the magnetic material 200 to produce the barrier layer 212 with a high resistance, which is, for example, hydrogen, oxygen, chlorine, fluorine, hydrogen chloride, hydrogen bromide, nitrous oxide or a combination thereof. The protective gas is, for example, a gas not reacting with the magnetic material 200 to produce the barrier layer 212 with a high resistance, which is, for example, nitrogen, argon, helium, neon, krypton or a combination thereof. Moreover, a concentration of the introduced reacting gas G is, for example, 1.5% to 25%.

The plurality of magnetic powder 210 in the magnetic material 200 partially irradiated by the energy beam L is melted to form a magnetic liquid, and the magnetic liquid is solidified to form the solidified layer 214. Moreover, since the magnetic liquid is in the environment filled with the reacting gas G, some reactions are taken place between the adjacent solidified layers 214 and on the surface of the solidified layer 214 to generate the barrier layer 212 with a high resistance property.

To be specific, referring to the steps S3, S4 of FIG. 2 and FIG. 3B, the plurality of magnetic powder 210 irradiated by the energy beam L may subject to a phenomenon similar to sintering or melting, and when the energy beam L is moved to another region, the plurality of magnetic powder 210 melted through the irradiation are solidified to form another solidified layer 214. Moreover, the reacting gas G is introduced during the solidifying process, and the magnetic material 200 reacts with the reacting gas G to form the barrier layer 212 with a high resistance on the surface of the solidified layer 214. After the above step, as shown in an enlarged view of FIG. 3B, a magnetic unit 220 having the barrier layer 212 coated on the surface of the solidified layer 214 is formed.

Figure 3C:
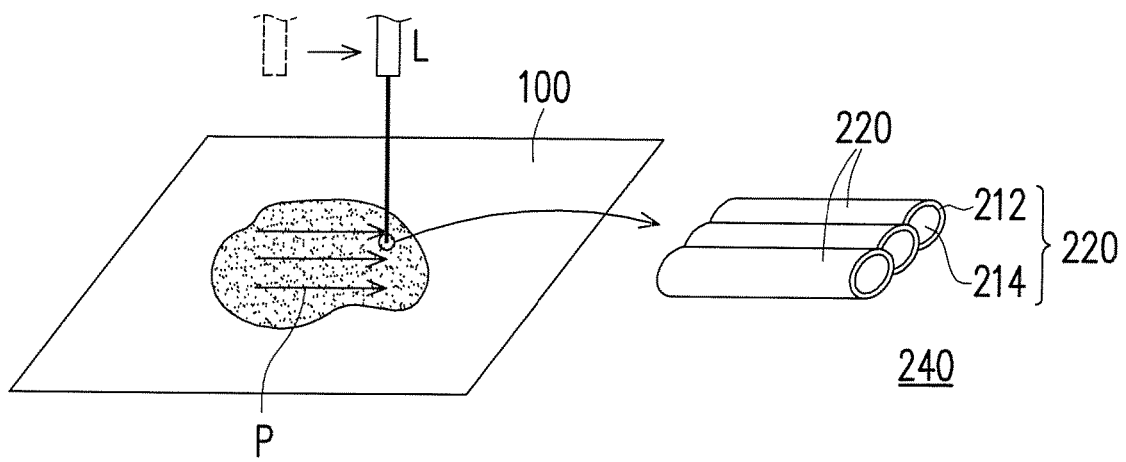

Then, referring to steps S31, S32 of FIG. 2 and FIG. 3C, after the magnetic unit 220 having the barrier layer 212 coated on the surface of the solidified layer 214 is formed, it is determined whether a manufacturing process of a same layer is ended (step S31), and if the manufacturing process of the same layer is not ended, a path P of the energy beam L is controlled to move the energy beam L to irradiate another portion of the magnetic powder 210 in the magnetic material 200, so as to repeat the step of forming the magnetic unit 220 having the barrier layer 212 coated on the surface of the solidified layer 214. In this way, the magnetic powder 210 in another portion of the magnetic material 200 can be melted under irradiation of the energy beam L and reacts with the introduced reacting gas G to form the barrier layer 212 on the surface of the solidified layer 214 as that shown in FIG. 3B. Now, the magnetic units 220, formed in the previous step S3 and the step S32, each having the barrier layer 212 coated on the surfaces of the solidified layers 214 are partially overlapped with each other to form a magnetic layer 240.

As shown in FIG. 3C, the magnetic units 220, formed in the step S31 and the step S32, having the barrier layers 212 coated on the surfaces of the solidified layers 214, for example, substantially present a cylindrical shape, respectively, and the magnetic units 220 are parallel to each other and are connected to each other through peripheral surfaces thereof. Moreover, the magnetic units 220 are overlapped to each other through the peripheral surfaces as that shown in FIG. 1B, and a magnitude of the overlapping region is determined by a line width and a gap of the adopted energy beam L, and in some embodiments, the overlapping region of the adjacent magnetic units 220 is 30% to 80% of the line width of the energy beam L, though the disclosure is not limited thereto.

Then, after the step S32 of forming the magnetic layer 240 having a plurality of the magnetic units 220 mutually overlapped is completed, the flow returns to the step S31 to determine whether the manufacturing process of the same layer is ended, and if not, the step S32 is repeated, by which the energy beam L moves along another path P in the region of the magnetic powder 210 that is not irradiated, so as to form another magnetic unit 220 according to the above mechanism. In the step S31, if it is determined that the manufacturing process of the same layer is ended (i.e., a single layer of the magnetic layer 240 is completed), the flow returns to the step S2, by which another layer of the magnetic material 200 is provided and laid down on the top of the magnetic layer 240, and the aforementioned steps S3, S4 to S31 and S32 for forming the magnetic layer 240 are repeated to combine the magnetic layers 240 layer-by-layer and produce a predetermined 3D magnetic device 300 as depicted in steps S5 and S6 of FIG. 2.

Figure 3D:
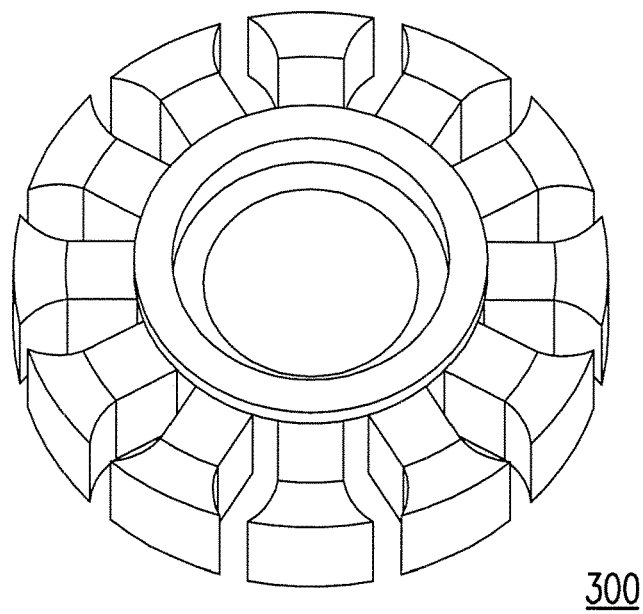
Figure 3E:
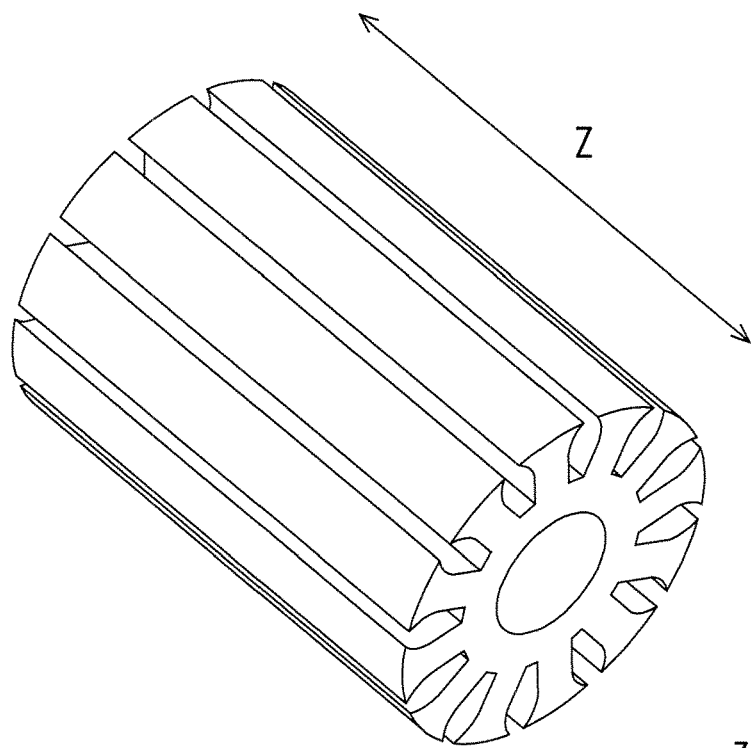

To be specific, the 3D magnetic device 300 produced according to the steps S1-S6 of FIG. 2 is shown as FIG. 3D and FIG. 3E, which is, for example, a 3D magnetic device applied to an ultra-high-speed motor or a special rotor, etc., where the magnetic device 300 has an extending direction Z.

The fabrication method of the magnetic device of the disclosure can be an additive manufacturing technique of powder bed melting, which includes selective laser sintering (SLS), selective laser melting (SLM), direct metal laser sintering (DMLS) and electron beam melting (EBM). Moreover, the fabrication method of the magnetic device of the disclosure can also be an additive manufacturing technique of direct energy deposition, which includes laser engineering net shaping (LENS) and 3D laser cladding.

In the present embodiment, the 3D printing technique and the additive manufacturing techniques are taken as an example for description, though the disclosure is not limited thereto. The above techniques belong to one of rapid prototyping techniques, by which a required product can be directly produced according to a digital model image data designed by the user, and the product can be a 3D entity of any shape.

By comparing a difference between the fabrication method of the magnetic device of the disclosure and the conventional manufacturing method, it is known that the fabrication method of the magnetic device of the disclosure may further meet the current demands on customized design and development of the magnetic device. To be specific, the current SMC material is formed by compressing the mixture of magnetic powder and a polymer material, and a product thereof has a great limitation in geometric shape, strength and heat dissipation effect. Moreover, a current lamination process of the silicon steel sheets is also limited by a manufacturing process of the silicon steel sheets, which results in a fact that that compression shaping of the silicon steel sheets is not easy. Comparatively, the fabrication method of the magnetic material of the disclosure may adjust and control a degree of oxidation according to different material properties, so as to fabricate complicated geometric shapes.

For example, in the present embodiment, the fabrication method of the magnetic device 300 may effectively breakthrough a barrier of the existing manufacturing technique, by which besides the magnetic device with a complicated geometric shape can be shaped, the fabrication method of the magnetic device 300 may also effectively cut the magnetic material of the same layer into smaller units compared to that of the existing technique, so as to effectively improve the performance of the magnetic material and mitigate the heating phenomenon of the magnetic material. Therefore, the fabrication method of the magnetic device of the disclosure can be well adapted to design of magnetic devices applied in motors, etc., in the future, so as to accomplish a development trend of miniaturization, high performance, high speed, low heating amount, etc.

To be specific, the 3D printing technique of the embodiment has different shaping mechanisms according to different apparatuses and materials, which is, for example, the aforementioned 3D printing technique of SLS or SLM, by which metal powder or ceramic powder is melted under irradiation of a laser light source for sintering a required 3D entity.

Regarding the 3D magnetic device formed by the aforementioned fabrication method, a method for adjusting a spatial distribution of the barrier layers in the magnetic device is, for example, to control an arranging order, an arranging pitch, and an arranging direction of the barrier layers, which are described in detail in the following embodiments.

First Embodiment

Figure 4A:
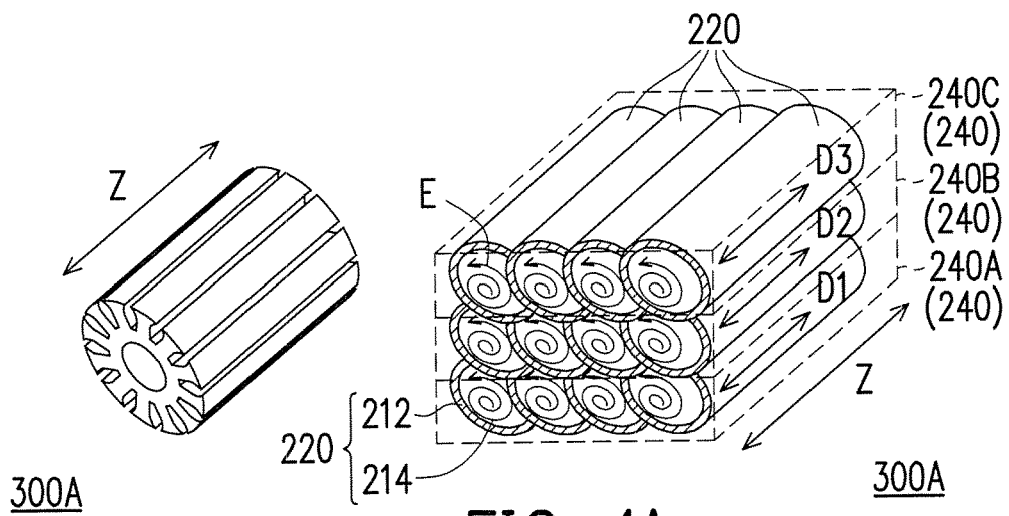
FIG. 4A is a schematic diagram of a magnetic device formed by the fabrication method of the magnetic device according to the first embodiment of the disclosure.

FIG. 4A is a schematic diagram of a magnetic device formed by the fabrication method of the magnetic device according to the first embodiment of the disclosure. Referring to FIG. 4A, by controlling an arranging pitch of the scan paths P of the energy beam L as shown in FIG. 3B and FIG. 3C, an arranging direction of the magnetic units 220 is controlled to be along the extending direction Z of the magnetic device 300 serving as a final product, i.e., the scan paths P of the energy beam L are parallel to the extending direction Z of the magnetic device 300, such that the magnetic units 220 coated with the barrier layer 212 are arranged in parallel to the extending direction Z of the magnetic device 300 serving as a final product, and detail thereof is described below.

In the present embodiment, as shown in FIG. 4A, in order to facilitate description, a situation that each magnetic layer 240 includes four sets of overlapped magnetic units 220 and three magnetic layers 240A, 240B, 240C are stacked is taken as an example for description, though the disclosure is not limited thereto.

As shown in FIG. 4A, the magnetic units 220 in the first magnetic layer 240A are arranged in parallel to each other along a first arranging direction D1 and are connected and partially overlapped to each other through peripheral surfaces thereof. The magnetic units 220 in the second magnetic layer 240B are arranged in parallel to each other along a second arranging direction D2 and are connected and partially overlapped to each other through peripheral surfaces thereof. The magnetic units 220 in the third magnetic layer 240C are arranged in parallel to each other along a third arranging direction D3 and are connected and partially overlapped to each other through peripheral surfaces thereof.

According to FIG. 4A, it is known that the first arranging direction D1 of the first magnetic layer 240A, the second arranging direction D2 of the second magnetic layer 240B and the third arranging direction D3 of the third magnetic layer 240C are all parallel to the extending direction Z of the produced magnetic device 300 to obtain the magnetic device 300A. Consistency of the extending directions of the magnetic units 220 may decrease an intersection space and an overall fabrication time. Moreover, in each of the magnetic layers 240A, 240B, 240C of the magnetic device 300A of the present embodiment, the eddy current E is limited within the range of the solidified layer 214 of each of the magnetic units 220.

Second Embodiment

Figure 4B:
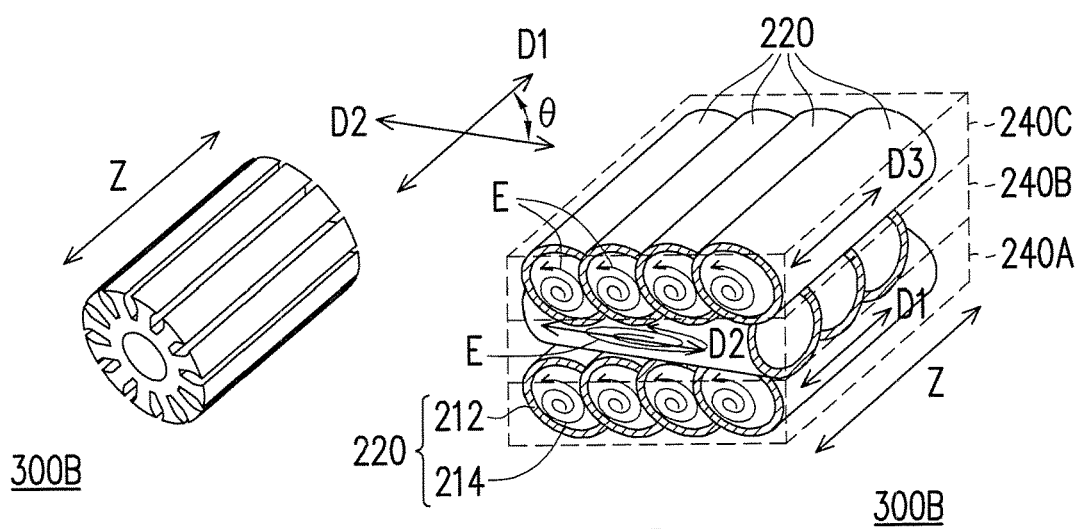
FIG. 4B is a schematic diagram of a magnetic device formed by the fabrication method of the magnetic device according to the second embodiment of the disclosure.

FIG. 4B is a schematic diagram of a magnetic device formed by the fabrication method of the magnetic device according to the second embodiment of the disclosure. The magnetic device 300B of the present embodiment is similar to the magnetic device 300A of the first embodiment. Referring to FIG. 2 and FIG. 3C, regarding a fabrication flow of different layers of the magnetic device 300B, when the flow returns to the step S2 from the step S31, the scan paths P of the energy beam L are changed, and the scan paths P of different magnetic layers are intersected to each other, such that the produced magnetic units 220 are arranged based on the intersected scan paths P to gradually form the first magnetic layer 240A, the second magnetic layer 240B and the third magnetic layer 240C with different arranging directions, and an intersected angle of the arranging directions of the first magnetic layer 240A, the second magnetic layer 240B and the third magnetic layer 240C can be dynamically adjusted according to the design of the magnetic device.

To be specific, as shown in FIG. 4B, the first arranging direction D1 of the first magnetic layer 240A and the second arranging direction D2 of the second magnetic layer 240B form an included angle θ therebetween, where the included angle θ is not equal to zero, and a range of the included angle θ is not limited. In an embodiment, the included angle θ can be set to about 45 degrees, 67 degrees or 90 degrees. A relationship between the second arranging direction D2 of the second magnetic layer 240B and the third arranging direction D3 of the third magnetic layer 240C is also the same. In the present embodiment, the included angle θ is, for example, 67 degrees, and the magnetic device 300B is obtained accordingly. In the present embodiment, since the magnetic layers 240A, 240B and 240C are stacked under different angles, the produced magnetic device 300B has good density and deformation amount. Moreover, the intersected structure design may further compress a flow range of the eddy current E to achieve good magnetic device performance and decrease a heating amount. In the magnetic device 300B of the present embodiment, the eddy current E of each of the magnetic layers 240A, 240B and 240C is limited within a range of the solidified layer 214 of each of the magnetic units 220. In detail, since the stacking of the magnetic layers 240A, 240B and 240C are along different angles, a direction of the generated eddy current E is different corresponding to a distribution position of each of the magnetic units 220.

Third Embodiment

Figure 4C:
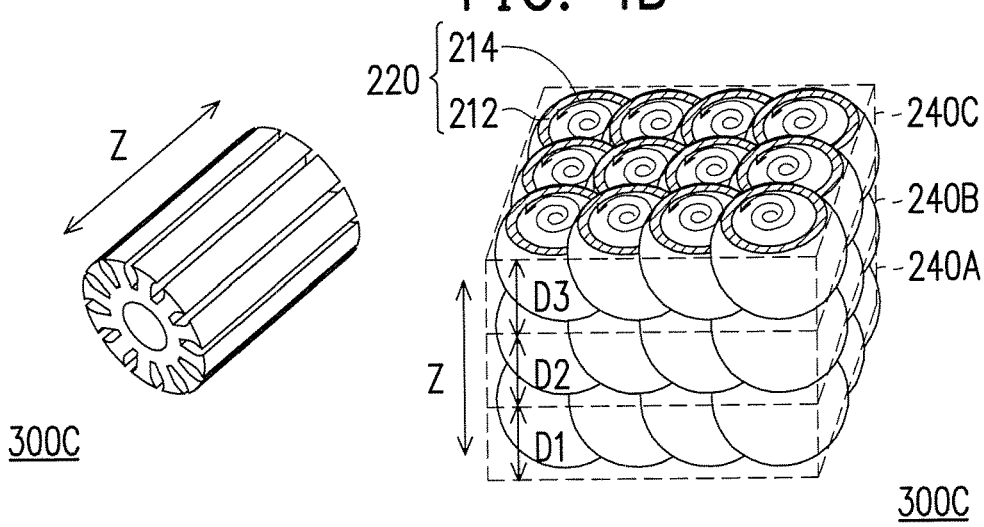
FIG. 4C is a schematic diagram of a magnetic device formed by the fabrication method of the magnetic device according to the third embodiment of the disclosure.

FIG. 4C is a schematic diagram of a magnetic device formed by the fabrication method of the magnetic device according to the third embodiment of the disclosure. The magnetic device 300C of the present embodiment is similar to the magnetic devices 300A and 300B of the aforementioned embodiments. In the magnetic device 300C of the present embodiment, the scan paths P of the energy beam L are changed, and the scan is performed in a dot manner. In this way, the produced magnetic units 220 are arranged through the intersection of the scan paths P and secondary repeat scan to achieve a block structure distribution, so as to form the magnetic layers 240 each having block structure distribution arranged in parallel directions as that shown in FIG. 4C.

To be specific, in the first embodiment and the second embodiment, the arranging directions of each of the magnetic units 220 are formed through continuous scan paths P of the energy beam L. However, in the third embodiment, the scan paths P of the energy beam L are not continuous, but are implemented in a dot manner. The magnetic units 220 of the adjacent magnetic layers 240A, 240B and 240C are mutually stacked through the peripheral surface thereof to form the block structure distribution of the magnetic units 220, such that the magnetic layers have a small distribution in an internal space to achieve the effect of decreasing the eddy current loss. In the magnetic device 300C of the present embodiment, the eddy current E of each of the magnetic layers 240A, 240B and 240C is limited within a range of the solidified layer 214 of each of the magnetic units 220.

In the aforementioned three embodiments, the magnetic devices can be used in collaboration to achieve good magnetic permeability and decrease the eddy current loss according to different applications and winding methods.

Compared to the conventional SMC material or the compression shaped silicon steel sheet, in the magnetic device 300A, the magnetic device 300B and the magnetic device 300C, each of the magnetic layers can be cut into the magnetic units with a small size, where the solidified layer 214 of each magnetic unit 220 is coated with the barrier layer 212, and the magnetic units 220 are stacked to form the 3D magnetic device 300. Since the barrier layer 212 may effectively decrease the effect of eddy current loss, compared to the conventional technique, the magnetic device 300A, the magnetic device 300B and the magnetic device 300C all have the technical effects of effectively decreasing the eddy current loss and the heating amount of the magnetic material, and avoiding damaging the produced product such as a motor due to overheat, etc.

Figure 5A:
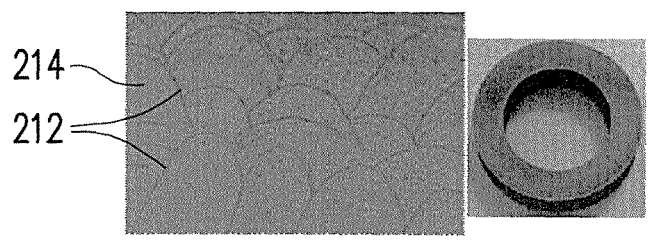
FIG. 5A to FIG. 5C are cross-sectional views of arranging pitches of magnetic devices formed according to the fabrication method of the magnetic device by changing a pitch.
Figure 5B:
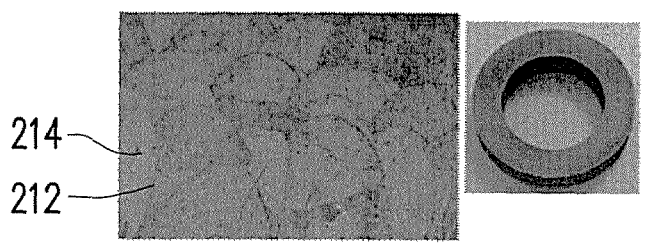
Figure 5C:

FIG. 5A to FIG. 5C are cross-sectional views of arranging pitches of the magnetic devices formed according to the fabrication method of the magnetic device by changing a pitch. Based on the aforementioned second embodiments, it is assumed that the energy beam L is a laser beam, the reacting gas is oxygen, and a concentration thereof is set to 5%, and by adjusting the scan paths and changing a pitch of the laser beam, an overlapping region of the adjacent magnetic units is 62.5%, 75% and 87.5% of a line width of the energy beam L, and observation results of cross sections of the arranging pitches of the formed magnetic devices are shown as FIG. 5A to FIG. 5C.

As shown in FIG. 5A, regarding a structure distribution of the magnetic device 400A fabricated in a case that the overlapping region is 62.5% of the line width of the energy beam L, a coating distribution of the oxidized barrier layer 212 is relatively dense, though the magnetic device 400A has a higher chance to have a defect due to over concentration of energy. As shown in FIG. 5B, the magnetic device 400B fabricated in a case that the overlapping region is increased to 75% of the line width of the energy beam L has better density. As shown in FIG. 5C, the magnetic device 400C fabricated in a case that the overlapping region is increased to 75% of the line width of the energy beam L has a flat structure distribution.

Figure 6A:
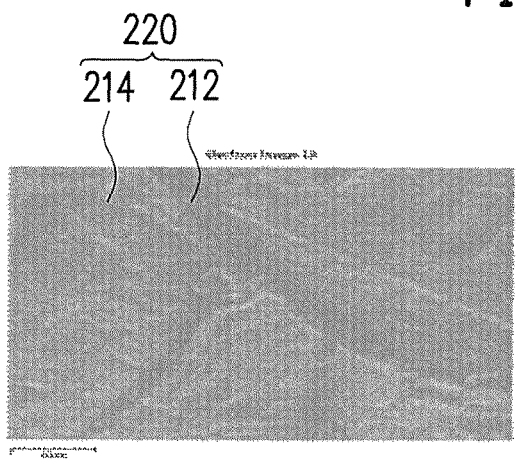
FIG. 6A and FIG. 6B are electron microscope ESD element distribution diagrams of a magnetic device formed by the fabrication method of the magnetic device of the disclosure.
Figure 6B:
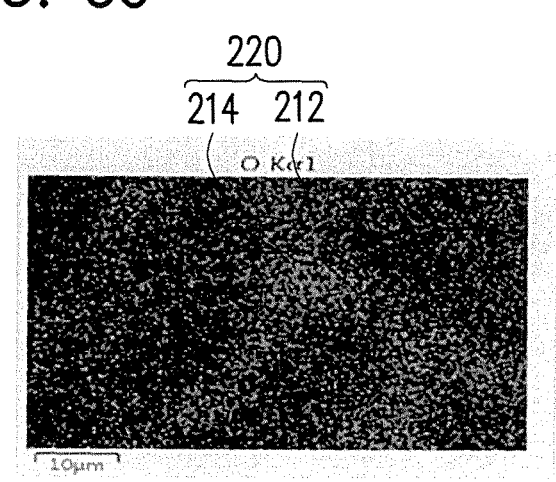

FIG. 6A and FIG. 6B are electron microscope ESD element distribution diagrams of a magnetic device formed by the fabrication method of the magnetic device of the disclosure. According to FIG. 6A and FIG. 6B, it is discovered that an oxidation layer serving as the barrier layer 212 is concentrated at periphery of the solidified layer 214 formed by sintering the magnetic powder 210, and oxidation component in internal of the solidified layer 214 is relatively less.

Figure 7:
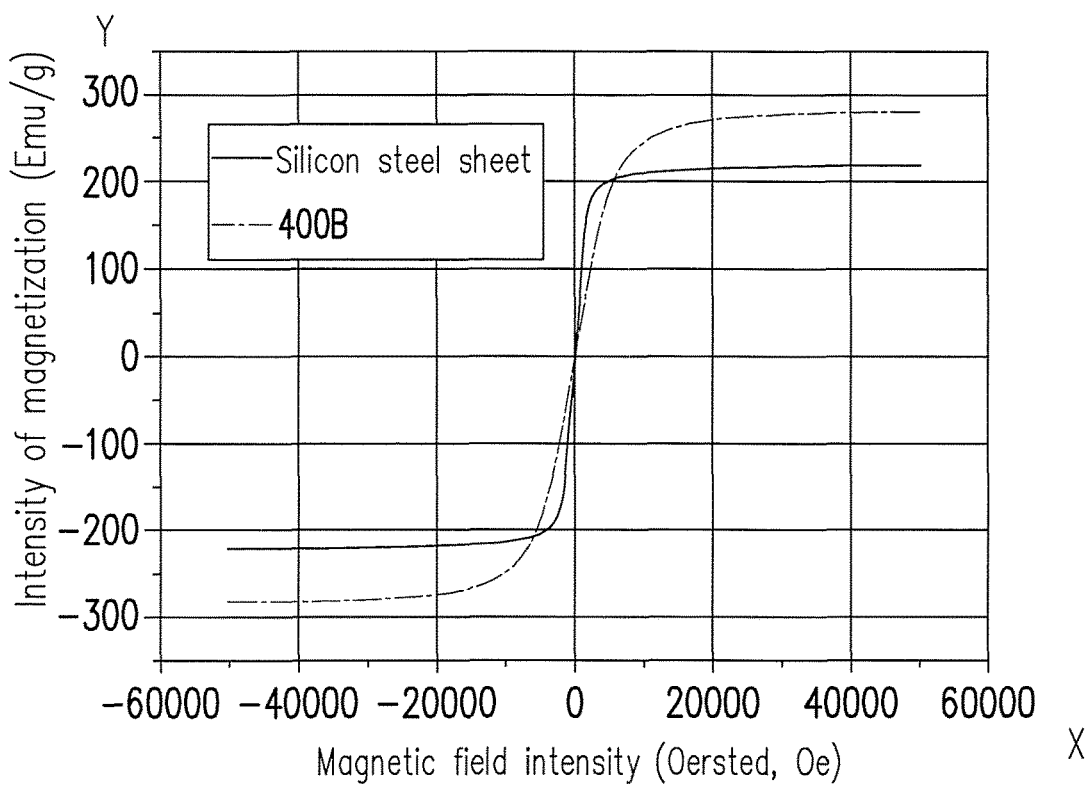
FIG. 7 is a relational graph of a relationship between magnetic permeability and performance of a magnetic device fabricated in a case that an overlapping region depicted in FIG. 5B is 75% of a line width of an energy beam L.

FIG. 7 is a relational graph of a relationship between magnetic permeability and performance of the magnetic device fabricated in a case that the overlapping region of FIG. 5B is 75% of the line width of the energy beam L, in which an X-axis and a Y-axis respectively represent magnetic field intensity (Oersted, Oe) and intensity of magnetization (Emu/g). As shown in FIG. 7, compared to the magnetic device fabricated through the conventional silicon steel sheet compression shaping, the magnetic permeability of the magnetic device 400B of the present embodiment is improved by about 35%. It should be noted that the magnetic device 400B of the present embodiment may have different magnetic permeability due to different magnetic materials. Moreover, the magnetic device 400B of the present embodiment is greatly improved in both of eddy current loss intensity and heat conductivity, which is shown in a following table 1:

TABLE 1

|  | Intensity of magnetization (emu/g) | High frequency magnetic loss PL(W/kg) 10K 100mT | Intensity (MPa) | Heat dissipation coefficient (W/mk) |
| --- | --- | --- | --- | --- |
| Silicon steel sheet | 170-210 | 2000 | 300-400 | 10-15 |
| SMC | 55 | 1256 | 20 | 1.2 |
| 400B of the embodiment | 285 | 312 | 800 | 15 |

According to table 1, it is known that compared to the magnetic device fabricated through the conventional SMC material or the silicon steel sheet compression shaping, the magnetic device fabricated according to the fabrication method of the magnetic device of the disclosure is improved in the effect of magnetic permeability by at least 35%, and particularly, by about 4 times (improved from 55 emu/g to 285 emu/g) compared to the magnetic device fabricated through the SMC material. In view of the eddy current loss intensity, the intensity of the present embodiment is twice or more of that of the conventional silicon steel sheet, and is 40 times of that of the conventional SMC material. In view of the heat conductivity, the heat conductivity of the magnetic device of the present embodiment is superior to the heat conductivity of the conventional silicon steel sheet, and is further 10 times greater than the heat conductivity of the conventional SMC material. Moreover, compared to the conventional subtractive processing technique, the fabrication method of the magnetic device of the disclosure may effectively breakthrough a barrier of the existing manufacturing technique to provide a customized appearance, which has more advantages in efficiency and cost.

Fourth Embodiment

Figure 8:
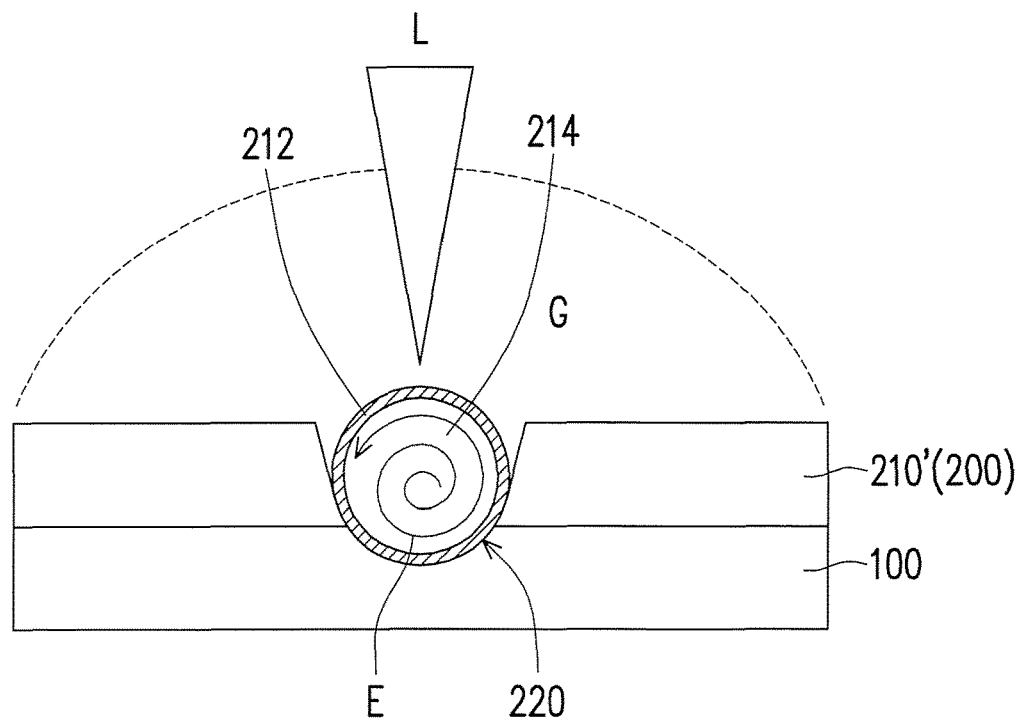
FIG. 8 is a schematic diagram of a fabrication method of a magnetic device according to an embodiment of the disclosure.

FIG. 8 is a schematic diagram of a fabrication method of a magnetic device according to an embodiment of the disclosure. Referring to FIG. 8, a difference between the present embodiment and the embodiment of FIG. 1 is that the magnetic material 200 includes a magnetic plate 210'. In the present embodiment, in the environment filled with the reacting gas G, the energy beam L is used to selectively irradiate a portion of the magnetic material 200, and the magnetic plate 210' in the irradiated partial region is melted and solidified to form the solidified layer 214. An outer layer of the solidified layer 214 is influenced by the reacting gas G to form a barrier layer 212 on the surface of the solidified layer 214, so as to form the magnetic unit 220 composed of the solidified layer 214 and the barrier layer 212. By adjusting the scan paths of the energy beam L, the solidified layer 214 coated by the barrier layer 212 may have different stacking and arranging manners, so as to limit a distribution range of the eddy current E. Detailed steps thereof have been introduced in the aforementioned embodiments, and details thereof are not repeated.

Figure 9:
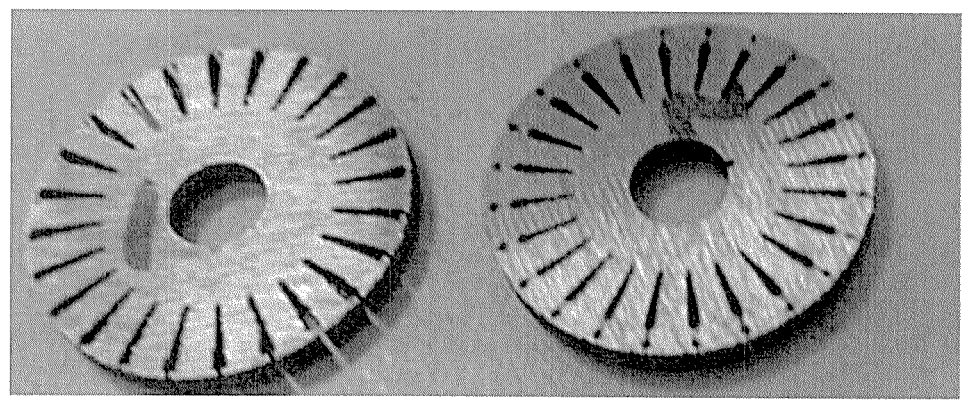
FIG. 9 is an appearance diagram of a magnetic device formed by the fabrication method of the magnetic device of the disclosure.

FIG. 9 is an appearance diagram of a magnetic device formed by the fabrication method of the magnetic device of the disclosure. Compared to the conventional silicon steel sheet compression shaping, the magnetic device with larger winding density and more complex shape and appearance can be made, which is line with a future design of the magnetic device of, for example, motors, etc., by which not only an easy fabrication process is provided, but also requirements for high performance, high speed, low heating amount, etc., are also satisfied.

According to the above descriptions, the fabrication method of the magnetic device of the disclosure provides an innovative additive manufacturing technique, in which by adjusting the reacting gas, during a solidification shaping process of the magnetic material, the magnetic material reacts with the reacting gas to form a barrier layer with high resistance property on the surface of the solidified layer, so as to decrease an eddy current area of an electromagnetic induction current and a proportion of the eddy current loss, and accordingly decrease a heating amount to improve efficiency and stability of the magnetic device applied in motors, etc., and provide the fabrication method of the magnetic device with a more free shaping characteristic.

In light of above, according to the fabrication method of the magnetic device of the disclosure, besides that the magnetic permeability is improved, the problems in eddy current loss and heat dissipation are greatly mitigated, so as to overcome the long term problems of high heating amount and poor performance of the magnetic device. Moreover, the additive manufacturing technique can be adopted to fabricate various miniature, thin and geometrically complex magnetic devices, so as to provide a novel technical solution for additive manufacturing and magnetic material industry.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A fabrication method of a magnetic device, comprising:
providing a magnetic material;
selectively irradiating a portion of the magnetic material by using an energy beam, and introducing a reacting gas externally and simultaneously, such that during a process that the energy beam melts and solidifies the magnetic material, the magnetic material is in an environment filled with the reacting gas, and the portion of the magnetic material being irradiated is melted and solidified to form a solidified layer, wherein an outer layer of the solidified layer reacts with the reacting gas to form a barrier layer on a surface of the solidified layer, so as to form a magnetic unit composed of the solidified layer and the barrier layer;
determining whether a manufacturing process of a same layer is ended, wherein if not, a path of the energy beam is controlled to move the energy beam to another portion of the magnetic material, and the step of forming the magnetic unit having the barrier layer coated on the surface of the solidified layer is repeated, and a plurality of magnetic units each having the barrier layer coated on the surface of the solidified layer are mutually overlapped to form a magnetic layer, and if the manufacturing process of the same layer is ended, the flow returns to the step of providing another layer of the magnetic material to a surface of the magnetic layer; and
repeating the steps of forming the magnetic layer to form a three-dimensional (3D) magnetic device.

2. The fabrication method of the magnetic device as claimed in claim 1, wherein the reacting gas comprises a reactive gas and a protective gas.

3. The fabrication method of the magnetic device as claimed in claim 2, wherein the reactive gas comprises at least one of hydrogen, oxygen, chlorine, fluorine, hydrogen chloride, hydrogen bromide and nitrous oxide.

4. The fabrication method of the magnetic device as claimed in claim 2, wherein the protective gas comprises at least one of nitrogen, argon, helium, neon and krypton.

5. The fabrication method of the magnetic device as claimed in claim 1, wherein a concentration of the reacting gas in the environment filled with the reacting gas is 1.5% to 25%.

6. The fabrication method of the magnetic device as claimed in claim 1, wherein in each of the magnetic layers, the magnetic units are arranged in parallel along an arranging direction, and are mutually connected through peripheral surfaces.

7. The fabrication method of the magnetic device as claimed in claim 6, wherein in each of the magnetic layers, the path of the energy beam is parallel to an extending direction of the magnetic device.

8. The fabrication method of the magnetic device as claimed in claim 6, wherein the arranging directions of adjacent magnetic layers are parallel to each other, and the magnetic units in the adjacent magnetic layers are stacked through peripheral surfaces.

9. The fabrication method of the magnetic device as claimed in claim 6, wherein the extending direction of the magnetic device is parallel to the arranging direction of the magnetic units.

10. The fabrication method of the magnetic device as claimed in claim 6, wherein the paths of different magnetic layers are intersected to each other.

11. The fabrication method of the magnetic device as claimed in claim 6, wherein the arranging directions of the adjacent magnetic layers form an included angle not equal to zero therebetween, and the magnetic units in the adjacent magnetic layers are stacked through peripheral surfaces.

12. The fabrication method of the magnetic device as claimed in claim 6, wherein the energy beam scans in a dot manner.

13. The fabrication method of the magnetic device as claimed in claim 1, wherein in the magnetic layer, an overlapping region of the adjacent magnetic units is 30% to 80% of a line width of the energy beam.

14. The fabrication method of the magnetic device as claimed in claim 1, wherein the fabrication method of the magnetic device comprises one of selective laser sintering (SLS), selective laser melting (SLM), direct metal laser sintering (DMLS) and electro beam melting (EBM).

15. The fabrication method of the magnetic device as claimed in claim 1, wherein the fabrication method of the magnetic device comprises one of laser engineering net shaping (LENS) and three-dimensional laser cladding.

16. The fabrication method of the magnetic device as claimed in claim 1, wherein the energy beam comprises a laser beam, an electron beam, an electric arc, or composite energy combined with two or more of the above beams.

17. The fabrication method of the magnetic device as claimed in claim 1, wherein an energy density of the energy beam is below $10^{12}$ W/cm$^3$.

18. The fabrication method of the magnetic device as claimed in claim 1, wherein the magnetic material comprises metal, ceramics, semiconductor, polymer or a composite material of the above materials.

19. The fabrication method of the magnetic device as claimed in claim 1, wherein the magnetic material comprises a permanent magnetic material.

20. The fabrication method of the magnetic device as claimed in claim 1, wherein the magnetic material comprises a plurality of magnetic powder.

21. The fabrication method of the magnetic device as claimed in claim 1, wherein the magnetic material is a magnetic plate.

* * * * *